United States Patent [19]

Yoshihiro et al.

[11] 4,181,254
[45] Jan. 1, 1980

[54] PNEUMATICALLY AND TEMPERATURE CONTROLLED VALVE CONSTRUCTION

[75] Inventors: Naruse Yoshihiro, Kariya; Ohumi Takeharu; Suzuki Yukio, both of Toyota; Harada Toshiro, Okazaki; Okuno Takao, Toyota, all of Japan

[73] Assignees: Aisin Seiki Kabushiki Kaisha, Kariya; Toyota Jidosha Kogyo Kabushiki Kaisha, Toyota, both of Japan; part interest to each

[21] Appl. No.: 844,961

[22] Filed: Oct. 25, 1977

[30] Foreign Application Priority Data

Oct. 22, 1976 [JP] Japan .......................... 51/142344[U]

[51] Int. Cl.² ............................................. G05D 23/10
[52] U.S. Cl. ....................................... 236/87; 137/599;
137/DIG. 8; 236/48 R; 236/101 C
[58] Field of Search ................. 236/87, 101 C, 101 E,
236/48 R; 137/DIG. 8, 599

[56] References Cited

U.S. PATENT DOCUMENTS

| 2,809,620 | 10/1957 | Boylan ............................ 236/87 X |
| 3,829,011 | 8/1974 | Scott ................................. 236/87 X |
| 4,061,265 | 12/1977 | Kitamura ......................... 236/48 R |
| 4,068,800 | 1/1978 | Doherty, Jr. ..................... 236/87 X |
| 4,087,965 | 5/1978 | Thornburgh ..................... 236/87 X |

Primary Examiner—Roy D. Frazier
Assistant Examiner—William E. Lyddane
Attorney, Agent, or Firm—Burns, Doane, Swecker & Mathis

[57] ABSTRACT

A pneumatically and temperature controlled valve construction adapted for interconnecting a pneumatic source to a pneumatically operating device when said construction senses one of a pair of certain values of vacuum and a certain temperature regardless of whether the others being sensed or not being sensed. The construction includes a single housing, a pair of vacuum operated valve means nested in the housing and a temperature operating valve means nested in the housing.

9 Claims, 2 Drawing Figures

PNEUMATICALLY AND TEMPERATURE CONTROLLED VALVE CONSTRUCTION

BACKGROUND OF THE INVENTION

This invention relates to an improved internal combustion engine control system and more particularly to an improved pneumatically and temperature controlled valve construction useable with such system or the like.

There have been known in the art a pneumatically controlled valve construction and otherwise a temperature controlled valve construction both suited for use for fluid flow controlling purpose, such as for example, for an internal combustion engine control system for preventing the known undesired polluted gas from being produced within the combustion chamber of the automotive vehicle engine.

It is customary that any type of these valve constructions currently in use is provided in single valve construction in single housing form even though the two types of valve construction may be together incorporated in a single internal combustion engine control system. This is considered to be a drawback, particularly, in case of such coequipment of the two types of valve construction in the single control system of the automotive vehicle engine, in that, a larger space is needed for such coequipment within the engine room of the vehicle and further a network of conduits associated with the coequipped two types of valve construction tends to be complicated or confused within the room.

SUMMARY OF THE INVENTION

Accordingly, it is an object of this invention to provide an improved pneumatically and temperature controlled valve construction having a single housing.

Another object of the invention is to provide an improved valve construction having a single housing and being controlled by any one of two different vacuum signals and a temperature signal regardless of whether or not the other signals being sensed.

Thus in the embodiment, there are comprised a single housing, a pair of vacuum operated valve means, a temperature operated valve means and a pair of common inlet and outlet ports formed in the housing to be fluidly connected by any one of the three valve means being disposed in opened position, regardless of the other valve means being or not being disposed in their opened position.

DESCRIPTION OF THE PREFERRED EMBODIMENT

Figure 1:
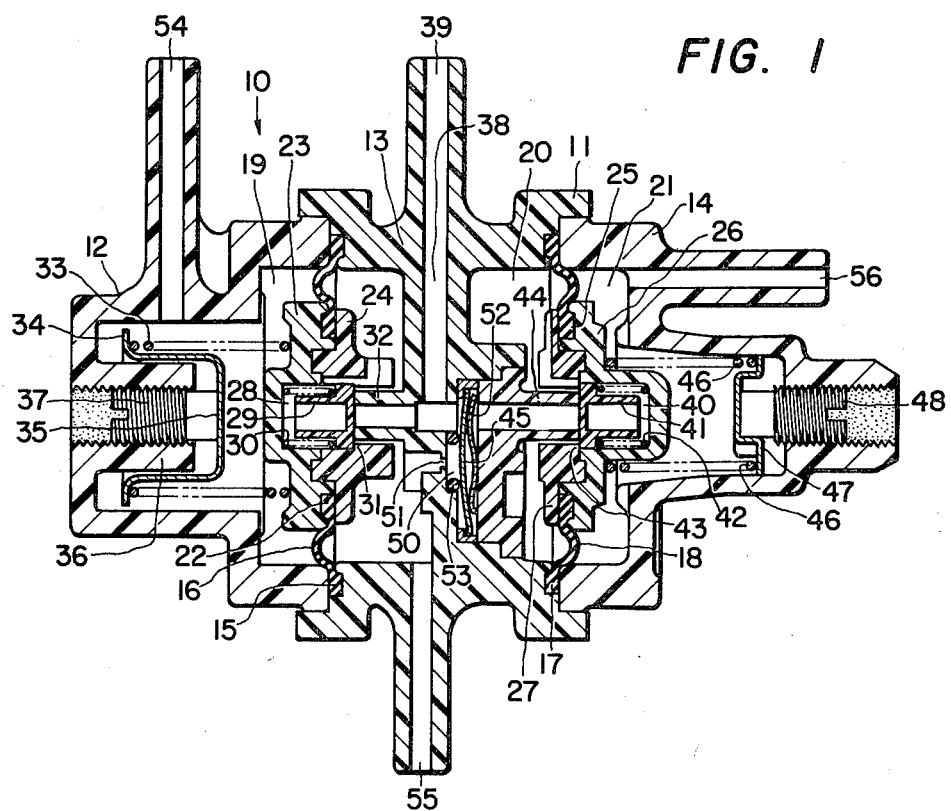
FIG. 1 is an enlarged scale cross sectional view of the improved pneumatically and temperature controlled valve construction.

Referring now to FIG. 1, a vacuum controlled and temperature controlled valve construction of this invention is generally indicated by the reference numeral 10.

As illustrated in FIG. 1, the valve construction 10 comprises a housing means 11 formed from a plurality of housing parts 12, 13 and 14 suitably secured together. The housing parts 12 and 13 trap the outer peripheral portion 15 of a flexible diaphragm 16 therebetween while the housing parts 13 and 14 trap the outer peripheral portion 17 of another flexible diaphragm 18 therebetween whereby the diaphragms 16 and 18 cooperate with the housing parts to define three chambers 19, 20 and 21 therein. The flexible diaphragm 16 is of annular form as will be seen in the illustration and the internal peripheral portion 22 of the diaphragm 16 is trapped by a movable member 23 and a clamping member 24 suitably secured together while the internal peripheral portion 25 of the diaphragm 18 is also trapped by another movable member 26 and a clamping member 27 also suitably secured together. From the arrangement, the movable member 23 and the clamping member 24 are carried by the diaphragm 16 and are adapted to move laterally in the view in union with the diaphragm 16 while the movable member 26 and the clamping member 27 are carried by the diaphragm 18 and are adapted to move laterally in the view in union with the diaphragm 18.

The movable member 23 and the clamping member 24 cooperate with each other to define a cavity 28 therebetween. Within the cavity 28 is slidably provided a valve 29 spring biased normally by a compression spring 30 toward abutment against a shoulder 31 being so shaped that the same is adapted to accomodate the right hand outer peripheral portion of the valve 29 as illustrated. The valve 29 is so disposed that the same is adapted to engage a seat 32 of tubular form to be described in detail as the discussion proceeds.

Referring again to the movable member 23, a large compressed spring 33 is anchored at its one end to the movable member and at the other end to the flanged portion 34 of a retainer 35 slidably guided by an internal tubular projection 36. An adjusting screw 37 is adapted to be threadedly disposed in a threaded opening of the wall of the projection 36 for adjusting an elestic energy stored within the spring 33. The spring 33 is adapted to normally urge the movable member 23 to the right so that the valve 29 may seat against the seat member 32 in a manner as will be apparent hereinafter.

The tubular form valve seat 32 is adapted to connect fluidly to a passage 38 extending to an outlet port 39 of the housing part 13 so that when the valve member 29 is disposed in its closed position against the valve seat 32, the valve seat 32 prevents interconnection of the chamber 20 to the outlet port 39.

The other movable member 26 and the clamping member 27 also cooperate with each other to define a cavity 40 therebetween as illustrated. Within the cavity 40 is slidably disposed a valve 41 spring biased normally by a compressed spring 42 toward abutment against a shoulder 43 being so shaped that the same is adapted to accomodate the left hand outer peripheral portion of the valve 41. The valve 41 is so disposed that the same is adapted to seat to or unseat from a tubular seat member 44 which will be described as the description proceeds, in detail.

The tubular seat 44 fluidly connects across a cavity 50 to the conduit or passage 38. When the valve member 41 is disposed in its closed position against the seat 44, the valve seat 44 prevents interconnection of the chamber 20 to the passage 38 and in turn to the outlet port 39.

A large compressed spring 46 is disposed in the housing part 14 and has its left hand end bearing against the movable member 26 and the other end thereof bearing against a retainer 47 which in turn bears against a adjusting screw 48 adapted to be threadedly disposed in a threaded opening of the wall of the housing part 14. The force of the compression spring 46 always tends to move the diaphragm 18 and the movable member 26 to the seated position of the valve 41 as illustrated.

As illustrated at the central portion of FIG. 1, the seat 44 and the middle housing part 13 cooperate to define therebetween the cavity 50 within which is so nested the snap acting bimetal disc 45 that the cavity permits the disc to snap to the bowed or unbowed condition upon sensing a certain predetermined temperature, as will be further described in greater detail hereinafter. The cavity 50 interconnects to the passage 38 and also interconnects across a small hole 51 to the chamber 20. The cavity 50 is peripherally so shaped that the same is adapted to accomodate the outer peripheral portion of the disc 45 that is normally held in abutment against the left side wall of the cavity by a leaf spring 52 disposed between the disc 45 and the right hand side wall of the cavity, the force of the leaf spring 52 normally tending to move the disc to its resilient O-ring type seat 53 for its seat closing position.

The housing part 12 has an inlet port 54; middle housing part 13 has an inlet port 55; and housing part 14 has an inlet port 56.

Figure 2:
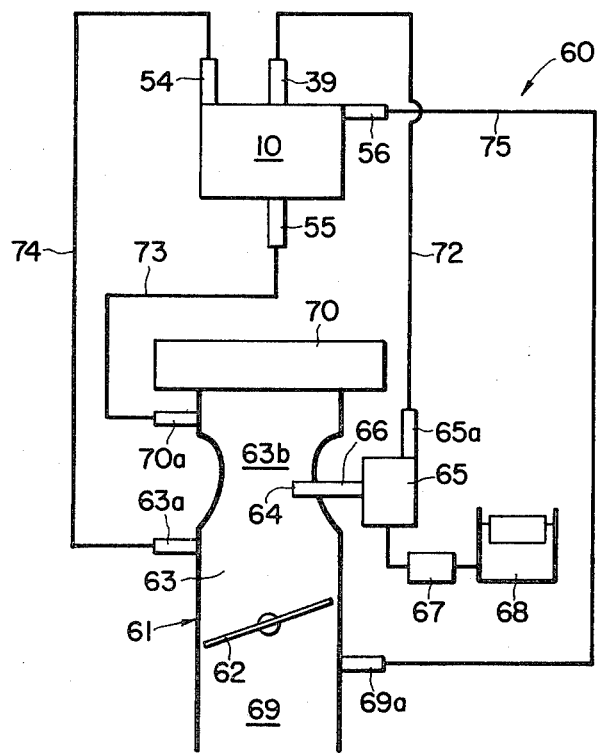
FIG. 2 is a schematic view illustrating the improved internal combustion engine control system of this invention.

Referring now to FIG. 2, there is shown the improved internal combustion engine control system of this invention generally indicated by the reference numeral 60 and represented as comprising a carburator generally indicated by the numeral 61. The carburator 61 includes as usual a throttle valve 62 manually operable through means of the known foot pedal (not shown), a venturi tube portion 63 having a cross sectionally gradually narrowed portion 63b, a main fuel nozzle 64 adapted to inject fuel into the venturi tube portion 63 due to the known venturi effect when air flow downward passes through the cross sectionally narrowed portion 63b of the venturi tube portion 63. The nozzle 64 is fluidly connected through a passage 66 to an air bleed 65 operable to blend air delivered through conduit 72 and its inlet port 65a from the valve construction 10 with fuel stream passing through the air bleed 65. The fuel is supplied from a float tank 68 through a jet 67, as indicated by the solid line, to the bleed 65. The jet 67 is adapted to restrain volume of the fuel flow therethrough to a predetermined one.

The carburetor 61 has at its upper top end an air cleaner 70 of the known type and is connected at its lower portion to an engine intake manifold 69 so that air flow is produced when the engine is operated from the air cleaner 70 through venturi portion 63 and then past the throttle valve 62 into the intake manifold 69.

The inlet port 54 of the valve construction 10 is interconnected through a conduit 74 to a port 63a positioned downstream of the narrowed portion 63b but upstream of the throttle valve 62. The other inlet port 56 of the valve construction 10 is connected through a conduit 75 to a port 69a positioned downstream of the throttle valve 62. The inlet port 55 of the valve construction 10 is fluidly connected through a conduit 73 to a port 70a immediately downstream of the air cleaner 70 to introduce cleaned air flow from the air cleaner 70 to the valve construction 10. The outlet port 39 of the valve construction is connected through conduit 72 and port 65a to the air bleed 65.

In operation, an air flow is produced due to operation of the internal combustion engine from the air cleaner 70 past the venturi tube portion 63, throttle valve 62 and the intake manifold 69 to the engine combustion chamber (not shown). The fuel is delivered from the nozzle 64 into the air flow due to the known pressure differential produced across the narrowed portion 63b and sprayed by that air flow thereinto.

When all parts of the valve construction 10 occupy the positions shown, the inlet port 55 is disconnected from the outlet port 39 and thus from the conduit 72 and further from the air bleed 65. No air is therefore delivered from the air cleaner port 70a, past the valve construction 10 into the air bleed 65. The fuel stream being passing through the air bleed 65 is not accordingly blended with air and hence the rate of the fuel within the carburetor 63 relative to the rate of air is kept at a higher one determined and referred to, as herein used, as "rich" of the fuel rate.

When vacuum is transmitted into the leftwardmost chamber 19 from the venturi port 63a, the diaphragm 16 is moved to the left in opposition to the force of the spring 33 in union with the movable member 23 and the clamping member 24 due to the pressure differential across the diaphragm. It should be noted that the chamber 20 is normally kept under atmospheric pressure through the air cleaner 70. The valve member 29 is unseated from its seat member 32 by such movement of the member 23 to thereby interconnect the inlet port 55 through chamber 20, tubular seat 32, and passage 38 to the outlet port 39. The air bleed 65 is therefore supplied with air through the air cleaner 70, port 70a, conduit 73, valve construction 10, and conduit 72.

In case where vacuum is transmitted into the righwardmost chamber 21 of the housing 11, the inlet port 55 is also interconnected to the outlet port 39 in the same manner as above described so that duplicated description is considered to be abbreviated in understanding operation of the valve member 41.

Since the valve construction of this invention is normally mounted within the engine room of the vehicle, the running of the engine may cause an ambient temperature to rise the bimetal disc temperature beyond its snapping point temperature, disposing the bimetal disc 45 in its unseated position from the resilient O-ring type seat member 53. The inlet port 55 is therefore interconnected through the chamber 20, hole 51, cavity 50, resilient seat 53 and passage 38 to the outlet port 39.

From the foregoing it will be understood that an open position of any one of the three valve members can cause the inlet port 55 to be interconnected to the outlet port 39, regardless of the other valve member being opened or not opened.

As seen in FIG. 2, the port 63a locates immediately downstream of the narrowed portion 63b while the other inlet port 69a locates downstream of the throttle valve 62. Such different locations beneficially cause the valve construction 10 to be responsive to a wider range of vacuum signal produced in the carburetor and the intake manifold. Since the internal combustion engine control system shown in FIG. 2 does not form a part of the invention and has been described in order to provide mere assistance for understanding the valve construction 10, further description thereof is considered to be abbreviated.

The following, however, is considered to be helpful for correct understanding of the features of the invention. When the vehicle equipped with the control system shown in FIG. 2 travels on an ordinary paved road, such as for example a town street road at an ordinary speed, the value of vacuum sources at the ports 63a and 69a are maintained below a certain value by the operating engine. The valve members 29 and 41 accordingly are disposed in their closed positions shown in FIG. 1 by their springs 33 and 46. Under such condition, should the ambient temperature so fall below the certain temperature that the bimetal disc 45 is caused to seat against the O-ring type seat 53, interconnection of the inlet 55 to the outlet 39 is prevented. No air is delivered from the valve construction into the bleed 65 to be blended with the fuel stream passing therethrough, particularly through the passage 66. The rate of oxygen relative to the rate of the fuel in the passage 66 is therefore kept at a lower level and thus fuel rate is kept at "rich". This is considered effective for pollution control purpose by restricting the Oxides of nitrogen produced by the internal combustion engine.

In case of ambient temperature rise beyond the certain one, the bimetal snap disc 45 will snap back to its opened position (not shown) to open the O-ring type seat 53. The air cleaner port 70a is accordingly interconnected through conduit 73, inlet port 55, hole 51, cavity 50, opened seat 53, passage 38, outlet port 39, conduit 72, and inlet port 65a to the bleed 65, and thus to the passage 66, regardless of whether or not the other valve members are disposed in their opened positions. The air is therefore delivered into the fuel stream passing through the passage 66 and the rate of fuel relative to the rate of air is constrained to a certain lower level, as herein used, referred to as "lean" rate of the fuel. The combustion within the engine combustion chamber gradually becomes moderate or slow because of the lower rate of the fuel within the combustion chamber. This is in turn effective to keep the combustion chamber at a lower level temperature.

The delivery of air in the bleed 65 further results in applying an excessive quantity of oxygen to the fuel so that the known undesired gas produced by the internal combustion engine, such as hydrogen monoxide and carbon monoxide, may be constrained to a lower level.

Therefore, it can be seen that this invention not only provides an improved pneumatically and temperature controlled valve construction compactly nested within a single housing member, but also this invention provides an improved internal combustion engine control system for pollution control purpose.

While the form of the invention now preferred has been illustrated and described as suited for the pollution control device, it is to be understood that other forms can be utilized and still come within the scope of the appended claims.

What is claimed is:

1. A pneumatic pressure and temperature responsive valve mechanism for use in interconnecting a pneumatic source to a pneumatically operated device, said valve mechanism comprising:
    a housing formed of first and second side housing parts and a middle housing part connected therebetween;
    a first diaphragm having an outer periphery thereof clamped between said first side housing part and said middle housing part such that said first diaphragm and said first housing part define a first chamber;
    a second diaphragm having an outer periphery thereof clamped between said second side housing part and said middle housing part such that said second diaphragm and said second housing part define a second chamber;
    said first and second diaphragms and said middle housing part defining a third chamber;
    a first vacuum passage for communicating said first chamber with a first vacuum supply;
    a second vacuum passage for communicating said second chamber with a second vacuum supply;
    an inlet for communicating said third chamber with said pneumatic source;
    an outlet for communicating said third chamber with said pneumatically operating device, said outlet having first, second and third ports for communicating with said third chamber;
    a first vacuum operated valve arranged to normally close said first port, said first valve being operably connected to said first diaphragm such that said first valve opens in response to the vacuum pressure in said first chamber being sufficiently less than the pressure in said third chamber to deflect said first diaphragm, to communicate said inlet with said outlet;
    a second vacuum operated valve arranged to normally close said second port, said second valve being operably connected to said second diaphragm such that said valve opens in response to the vacuum pressure in said second chamber being sufficiently less than the pressure in said third chamber to deflect said second diaphragm, to communicate said inlet with said outlet; and
    a bimetallic third valve arranged to normally close said third port, said third valve being arranged to be acted upon by pneumatic temperature in said third chamber so as to be deflected to an open position in response to such temperature reaching a selected value, to communicate said inlet with said outlet;
    said first, second and third valves being arranged to open and close independently of one another such that any of said valves may be open regardless of whether either of the other two valves is open.

2. A pneumatically and temperature controlled valve construction as set forth in claim 1 wherein said housing has a pair of inlet and outlet ports, each of said vacuum operated valve means has a vacuum operated servo mechanism and a valve member operatively connected to the servo mechanism and adapted for interconnecting the inlet port to the outlet port independently of other valve means and said temperature operated valve means has a bimetal member adapted for interconnecting the inlet port to the outlet port when the bimetal member senses said certain temperature regardless of the vacuum operated valve means being or not being operated.

3. A pneumatically and temperature controlled valve construction as set forth in claim 2 wherein, said bimetal member comprises a snap disc.

4. A pneumatically and temperature controlled valve construction as set forth in claim 3 wherein said temperature operated valve means has a resilient O-ring type seat through which the inlet port is adapted to be interconnected to the outlet port, said bimetal snap disc being of circular form to be accommodated to the seat to open and close the same.

5. A pneumatically and temperature controlled valve construction as set forth in claim 4 wherein each of said vacuum operated servo mechanism has a diaphragm and a chamber defined by cooperation of the diaphragm and the housing adapted for introducing therein vacuum energy to cause the diaphragm to move due to pressure differential across the same for actuating the valve connected thereto.

6. A pneumatically and temperature controlled valve construction as set forth in claim 5 wherein, each of said diaphragms has a movable member and a clamping member disposed at a central portion of the diaphragm and secured together to trap the central portion of the diaphragm for movement in union with the diaphragm, said movable member and said clamping member cooperating to carry said valve member.

7. A pneumatically and temperature controlled valve construction as set forth in claim 6 wherein, said housing is formed of a pair of side housing parts and a middle housing part interposed therebetween when assembled into the said single housing, first one of the side housing parts and said middle housing part being secured together and trapping therebetween the outer peripheral portion of first one of said diaphragms so that the diaphragm cooperates with the housing parts to define a first chamber, the other second one of the side housing parts and said middle housing part being secured together and trapping therebetween the outer peripheral portion of the other second one of said diaphragms so that said second one of the diaphragms cooperates with the said second one of the side housing parts to define a third chamber disposed oppositely to the said first chamber relative to the middle housing part and a second chamber is defined by cooperation of the middle housing part and the two diaphragms.

8. A pneumatically and temperature controlled valve construction as set forth in claim 7 wherein, the middle housing part is provided with the said inlet and outlet ports and carries therein a pair of seat members adapted respectively for engagement with valve members respectively being carried by the diaphragms for actuating the same to an opened or closed position when the diaphragms move due to the pressure differential.

9. A pneumatically and temperature controlled valve construction as set forth in claim 8 wherein, the middle housing part has a common passage leading to the outlet port while commonly connected to each of all the seats respectively cooperating the three valve members.

* * * * *